Fig. 1

INVENTOR.
HAROLD R. AHRENS

Oct. 13, 1964

H. R. AHRENS

3,153,141

RECORDER CHART ANALYZER

Filed April 20, 1959

NEON SWITCH CIRCUIT

INVENTOR.
HAROLD R. AHRENS

BY

*Paul N. Critchlow*
ATTORNEYS

Fig. 4

INVENTOR.
HAROLD R. AHRENS

3,153,141
RECORDER CHART ANALYZER
Harold R. Ahrens, San Diego, Calif., assignor to the United States of America as represented by the Secretary of the Navy
Filed Apr. 20, 1959, Ser. No. 807,736
3 Claims. (Cl. 235—61.6)
(Granted under Title 35, U.S. Code (1952), sec. 266)

The invention described herein may be manufactured and used by or for the Government of the United States of America for governmental purposes without the payment of any royalties thereon or therefor.

This invention relates to data analysis in general and more particularly to a system for automatically analyzing data recorded graphically on strip charts and producing an output which may be employed in conjunction with various computer apparatus and other readout equipment.

Most of the data processing systems in operation to date require complex combinations of mechanical and electrical components operatively coordinated to effect scanning, analyzing, interpretating, referencing and reading out graphical data observed on a moving strip chart. In addition to being complex, said systems are usually awkward to handle physically and difficult to operate. Moreover, their accuracy and efficiency is ordinarily such as to limit their usefulness to specific operations.

The subject invention consists of a more sophisticated configuration which is ostensively characterized by improved accuracy and efficiency and a broadened scope of appreciation.

The primary object of this invention is, therefore, to provide a new and improved graphic data analyzing system.

Another object of this invention is to provide a practical means of handling time-varying, low-frequency, experimental data which must be remotely recorded and subsequently processed and reduced.

Still another object of this invention is to provide a new and improved data analyzer which replots the data with compression or expansion of the time scale.

An important object of this invention is to provide a new and improved data analyzer which may be read out by numerous existing computer apparatus, avoiding any necessity for construction of further specialized equipment.

A further object of this invention is to provide a new and improved system for sampling data from a chart and inserting correction factors as necessary to meet operational requirements.

Last but not least, it is an object of this invention to provide an optimized electronic data analyzing system with increased reliability due to minimizing moving mechanical parts.

The exact nature of this invention as well as other objects and advantages thereof will be readily apparent from consideration of the following specification relating to the annexed drawing that illustrates a preferred embodiment, wherein.

Figure 1:
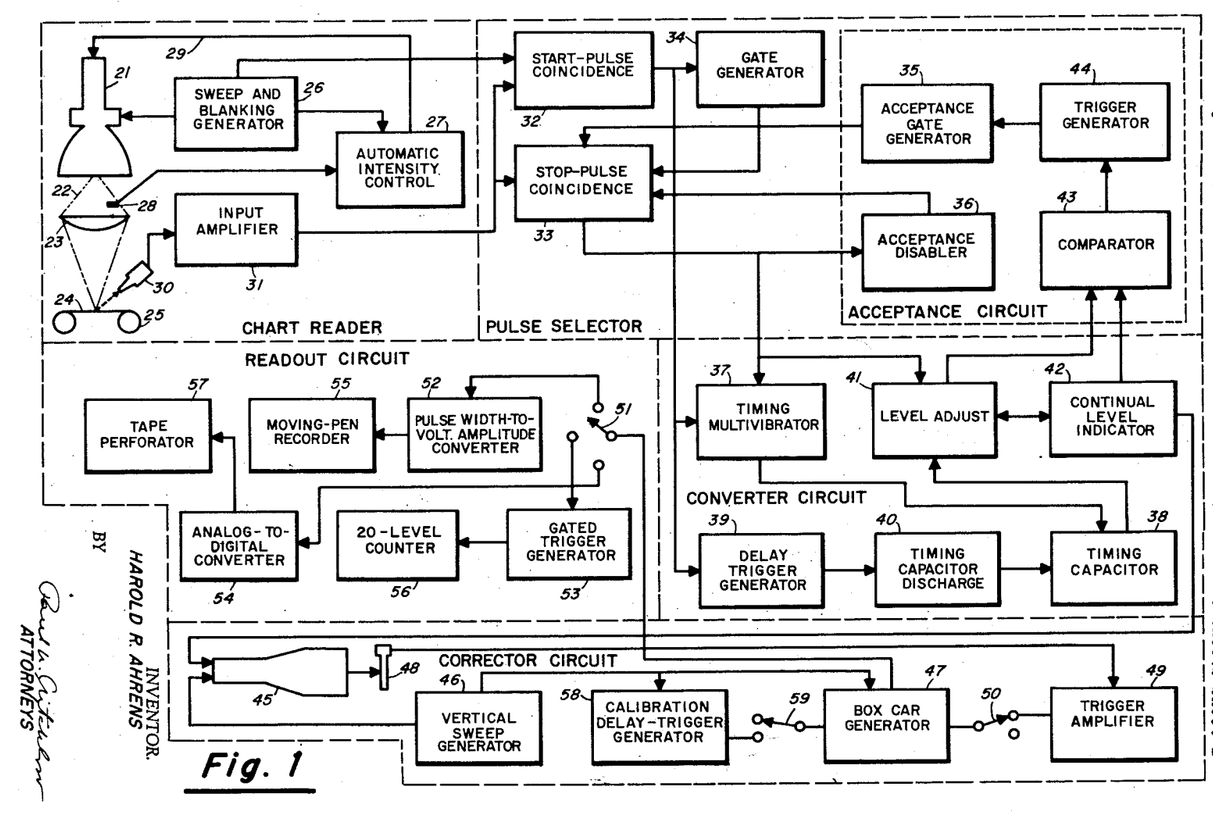
FIG. 1 is a block diagram illustrating the entire apparatus of this invention.

Referring now to the drawings, wherein like reference characters designate like or corresponding parts throughout the several views there is shown in the preferred embodiment illustrated in FIG. 1 an electronic flying spot scanner 21 such as a cathode ray tube of the 5WP15 and 5ZP16 types or the like which sweeps a spot of light 22 through a television lens 23 onto a strip chart 24 containing intelligence or data in linear or graphic form. Said strip chart is driven by a conventional variable speed drive mechanism 25 which enables it to be scanned continuously at a different position as it moves along.

To make said light spot appropriately sweep across said chart, a sweep and blanking generator 26 is employed in conjunction with said flying spot scanner in such manner that the magnetic deflection coils thereof cause said spot to move in a substantially circular or Lissajous pattern. Since only a portion of said pattern can be used to an advantage, only a section is projected onto the tape and the unused portion is blanked. A sweep repetition rate of 60 cycles per second may be used which enables the signal input thereto to be derived from a conventional 60 cycle power line. At this scan rate, a chart speed of four feet per minute permits the analysis of a 100 foot roll of data in less than one-half hour and takes approximately 75 samples per inch of chart. Of course, much higher rates of scanning are possible, the limitation only being determined practically by the mechanical limitations of the readout equipment.

A uniform light intensity distribution is constantly maintained across the face of the flying spot scanner by an automatic intensity control 27, thereby reducing adverse operational effects due to aging of the phosphor face of the scanner and concomitant voltage drifts. The automatic intensity control is, of course, merely a negative feedback circuit in which a decrease in scan intensity, as ascertained by a light-sensitive pick-up 28, results in a positive voltage being fed back through a conductor 29 to the flying spot scanner grid which increases the intensity, as will be explained in greater detail below.

Two photomultipliers 30 observe the scanning of the chart, the effective field of each being about one-half the chart width. The output signals of the photomultipliers are fed into an input amplifier 31 where they are amplified and refined in such manner that low-level noise is substantially eliminated therefrom, after which they are injected into a start-pulse coincidence 32 and a stop-pulse coincidence 33 simultaneously in the form of trigger voltage pulses. The first of such pulses corresponds to the scanning of the zero coordinate of the chart and, thus, acts as a reference datum. It is this pulse which is accepted by the start-pulse coincidence circuit which, in turn, produces an output signal that is subsequently used for timing purposes. The trigger pulse corresponding to the data line on the chart is isolated by said stop-pulse coincidence circuit. To be selected by this circuit, the data trigger pulse must fall within a given time period or region defined by two gates, a broad gate generator 34 occupying the entire region between but not including the markers for the extremes of the record chart; and a narrow acceptance gate generator 35 that limits the portion of the chart under consideration during any one scan to a region on either size of the position of the data line on the previous scan. This latter acceptance gate generator reduces the possibility of error resulting from spurious paper noise or other interference signals. In event the data pulse escapes from the acceptance gate region, the acceptance generator is disabled by an acceptance disabler 36 until the proper signal is regained.

It may, thus, be seen that said start-pulse coincidence and said stop-pulse coincidence cooperate to provide signals having a time differential which is proportional to the distance between the zero coordinate or reference datum of the chart and the graphic data being scanned and observed. These signals are fed into a pulse-time amplitude converter containing a timing multivibrator 37 which, in turn, appropriately initiates and discontinues the charging of a timing capacitor 38 and, at the same time, allows said timing capacitor to charge at a nearly-linear rate without the presence of deleterious interference coupling between said start-pulse and stop-pulse signals. Hence, the chart distance between the zero coordinate and the data line is represented by the voltage across said timing capacitor. Inasmuch as the timing capacitor must be discharged after each scan, the start pulse signals are also conveyed to a delay-trigger generator 39 which causes a timing capacitor discharge circuit 40 to be actuated after an appropriate delay period to timely discharge said timing capacitor prior to and in preparation for the next scan and the accompanying timing capacitor charging cycle.

The output signals of the stop-pulse coincidence and the timing capacitor are fed into a voltage level adjust 41 and a continual level indicator 42 which function together as a keyed peak-reading voltmeter that determines and indicates the voltage at which the timing capacitor is charged and, furthermore, puts out a voltage corresponding to distance between said reference datum and the data curve. After being appropriately adjusted for voltage level by said level adjust, the stop-pulse coincidence output signal is fed from the keyed peak-reading voltmeter to an acceptance circuit including a comparator 43. Likewise, after being adjusted for the proper voltage level, the timing capacitor output signal is fed through the continual level indicator to said comparator. The function of comparator is to drive a trigger generator 44 at the instant the descending timing-condenser voltage discharges across a reference voltage level in such manner that said trigger generator timely actuates the aforesaid acceptance gate generator to limit the area of the chart from which a stop-pulse signal will be accepted on any one scan to a region of given width on either side of the position of the data line in existence during the previous scan. Said reference voltage level varies with the distance between the zero coordinate of the chart and the immediately preceding data line and is substantially equal to the level adjusted timing capacitor voltage plus a predetermined but controllable bias voltage.

The output voltage signal representing the chart data line is coupled from the aforesaid continual level indicator to a corrector circuit including a cathode ray tube 45. Said signal is actually applied to the horizontal deflection plates of said cathode tube which varies the position of the spot on the face of said cathode ray tube as a function of the amplitude thereof. To provide a vertical sweep for said spot, a vertical sweep generator 46 is electrically coupled to the vertical deflection plates of said cathode ray tube in a substantially conventional manner, which operatively provides two degrees of travel freedom for said spot as it moves on the face of the cathode ray tube.

Simultaneously with the start of each vertical sweep, a bistable multivibrator type of boxcar generator 47 is triggered by the vertical sweep generator and initiates a square wave output, the pulse width of which is determined effectively by the distance between the chart zero coordinate and the data line. This is achieved by training a photomultiplier tube 48 on the face of the cathode ray tube which, in time, produces an off-trigger signal whenever the spot sweeps across a calibration line or mask appropriately positioned on the face thereof. The off-trigger signal is fed to an amplifier 49 and then coupled to the boxcar generator through a switch 50 where the pulse width is modified accordingly.

The boxcar output may be reconverted to an analog voltage by means of a simplified version of the timing capacitor and keyed peak-reading voltmeter combination described above. It may also be used to gate a clocking oscillator, producing a chain of pulses the number of which is proportional to the boxcar output pulse width. These pulses, in turn, are fed into suitable counting circuits to provide a digital output.

The boxcar square wave output signals are coupled to a read-out circuit where they are then applied through multiple-switch 51 to a pulse width-to-voltage amplitude converter 52, a gated trigger generator 53, and an analog-to-digital converter 54 as desired, either individually or in concert. Said pulse width-to-voltage amplitude converter produces an output signal whose voltage amplitude is proportional to the width of the boxcar output signal. This amplitude voltage signal is then coupled to a moving-pen recorder 55 or the like for graphic replot. Also, said boxcar output signal may be fed to said gated trigger generator which produces trigger pulses which are fed to a 20-level counter 56 which, in turn, provides a read-out of accumulative amplitude distribution. Likewise, said boxcar output signal may be fed to said analog-to-digital converter when it is transformed into a signal for actuating a tape perforator 57 and subsequently reading out on a punched paper tape or some similar apparatus. It should be understood, however, that other read-out systems such as analyzing computers etc. would be suitable for operation in conjunction with the aforementioned record chart analyzer system without deviating from the spirit of this invention.

Calibration is effected by adjusting the boxcar generator signal width to coincide with a calibrated input according to some convenient relationship and marking the position of a blanked spot appearing on the face of the cathode ray tube while the photomultiplier is removed therefrom. This is accomplished by feeding the output of the vertical sweep generator to a calibration delay-trigger generator 58 that produces an output signal of width which may be manually varied as necessary for calibration purposes. This variable output signal is coupled through a switch 59 to the boxcar generator where it simulates the off-trigger signal of the aforementioned photomultiplier. Thus, adjusting the spot on the face of the cathode ray tube to coincide with the output signal of the calibration delay-trigger generator may be effected by adjusting the width of the boxcar square wave output and calibration is achieved according to said convenient relationship.

Figure 2:
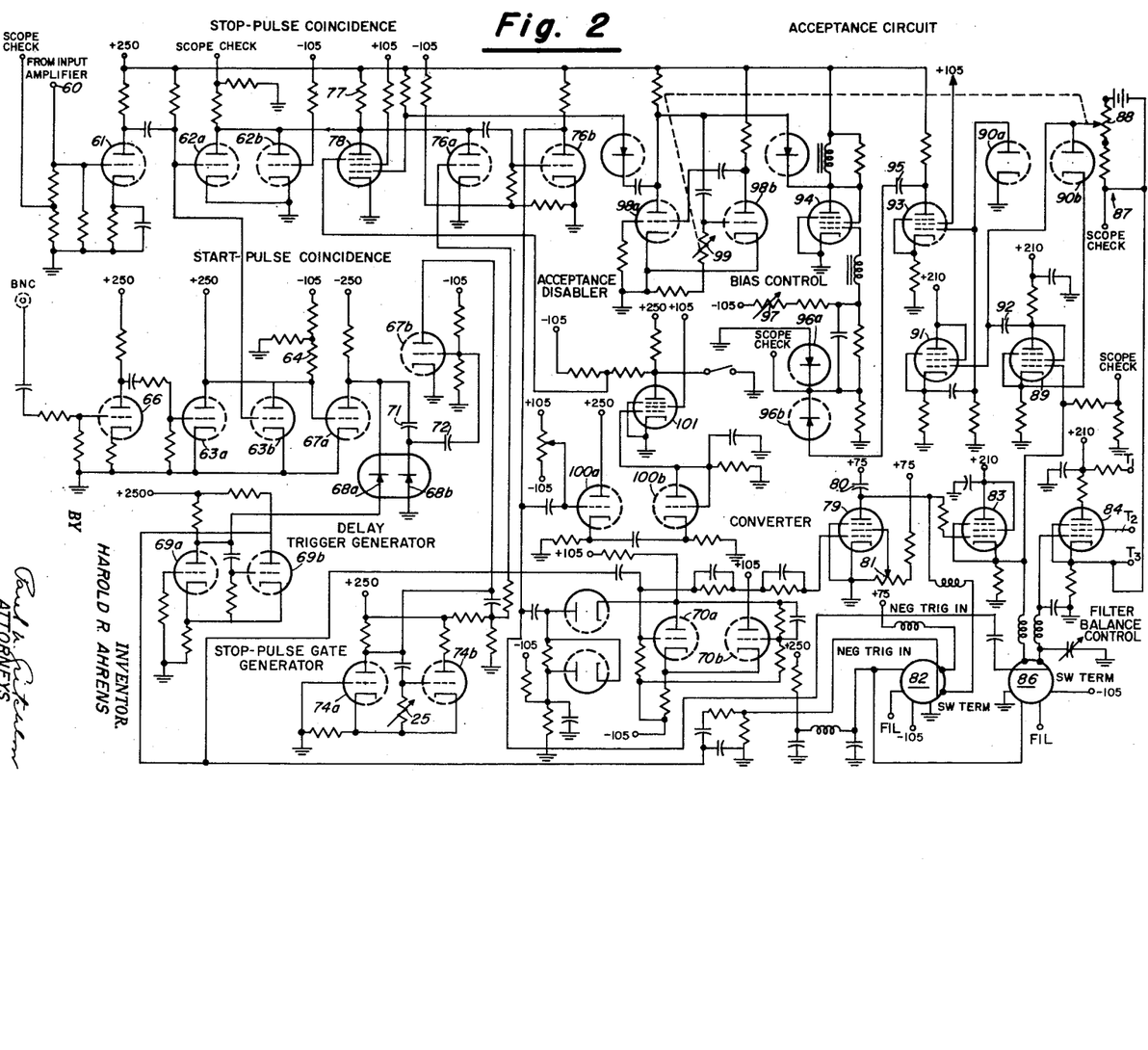
FIG. 2 is a schematic diagram illustrating details of the pulse selector, acceptance, and converter circuits.
Figure 3:
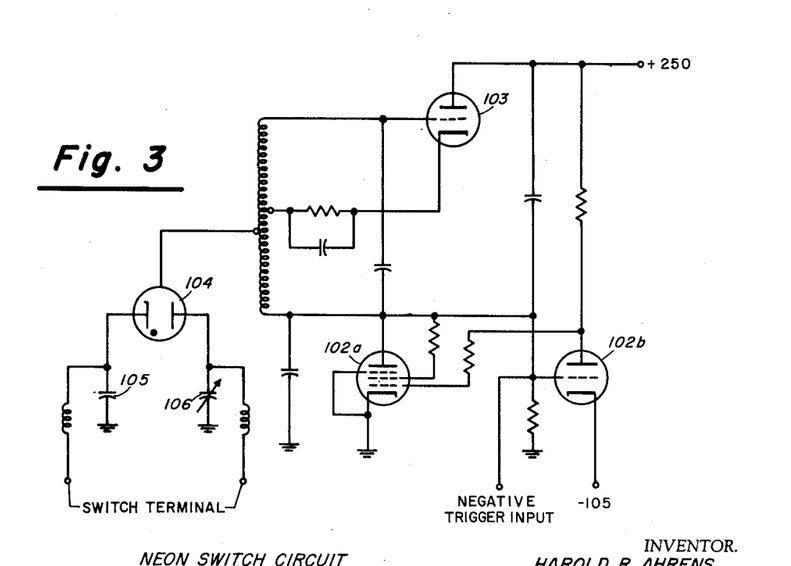
FIG. 3 is a schematic diagram depicting details of the neon switch circuit.
Figure 4:
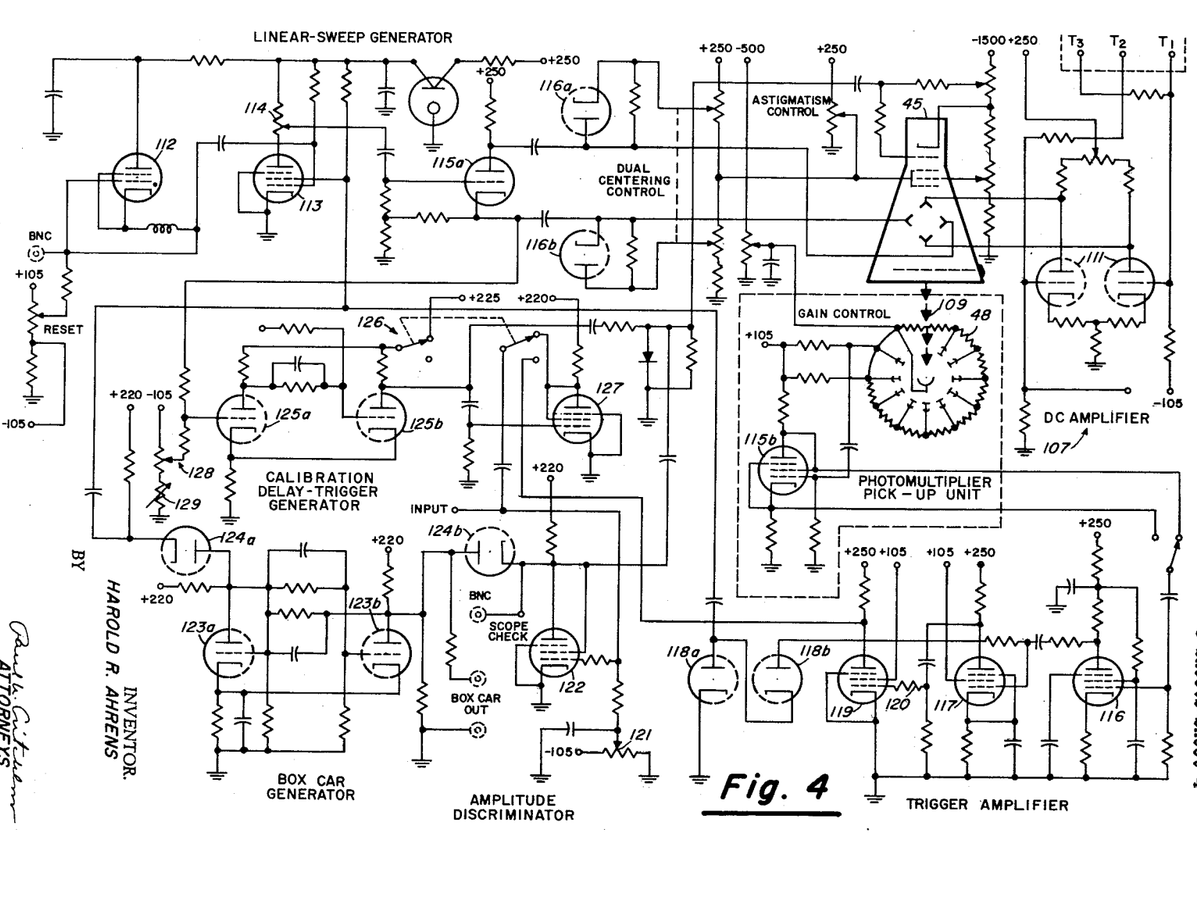
FIG. 4 is a schematic diagram showing details of the connector and calibration circuits.

Although most of the components used in the system constituting this invention are in themselves conventional, to facilitate a better understanding of their details and their particular arrangement, several of the most pertinent elements are further defined schematically in FIGS. 2, 3, and 4.

The pulse selector and converter schematic diagram of FIG. 2 is considered to be of importance in this respect. The uniform voltage pulses or triggers derived from the photomultiplier are ultimately fed into the pulse selector at a terminal 60. Both positive and negative triggers are present but only the positive ones are significant. Actually, there will be a minimum of four positive pulses present for the normal scan of a two-coordinate chart. The first represents the zero coordinate; the second, the extreme full-scale coordinate; and the fourth is generated by the blanking of the flying-spot scanner. Present also may be a false signal due to paper imperfections or transient interference. The pulse selector selects the zero-coordinate or start-pulse and the data-line or stop-pulse and presents them through separate channels to the converter where the time between the two is interpreted in terms of voltage amplitude.

The positive pulse triggers supplied indirectly by the photomultiplier are fed into the stop-pulse coincident circuit where they are amplified and inverted by a triode tube 61 and fed to the grid of triode tubes 62a and 63b. Triode tube 63 is one-half of the start pulse coincidence dual diode tube. The two plates of this dual diode are connected to a common load resistance 64; the grids, under no signal conditions, are either at ground or positive. Both grids must be negative simultaneously to produce an appreciable signal at the plate. The other half of said dual-diode, a triode 63a is driven negative for a period of time corresponding to about the first one tenth of each scan by a signal from the scan generator. This signal is derived by differentiating the positive unblanking pulse. It is then amplified and inverted by a triode tube 66 and applied to the grid of tube 63a. Any negative pulse appearing on the grid of tube 63b during this time, when tube 63a is cut off, is amplified and appears on the plate thereof. It is expected, of course, that the trigger corresponding to the scanning of zero coordinates will come through during this time. Occasionally, the data line pulse could also occur in this first one tenth of the scan, but only the first part occurring within this region is effective in subsequent circuitry. A tube 67a, into which the signals from tubes 63a and 63b are coupled, is biased well below cutout at approximately minus 50 volts and, therefore, respond only to the large positive signal which obtain when both grids of tubes 63a and 63b are simultaneously driven negative. Actually, the start pulse coincident circuits performs three functions; it starts the charging of linearly-charging timing condenser in the converter section; it triggers a delay-trigger generator which, some time between scans, produces a trigger which initiates the discharge of the timing condenser; and, after a brief delay, it triggers the stopped-pulse gate generator which generates the variable major stop-pulse coincidence gate, outside of which pulses will not be effective. The negative start pulse appearing on the plate tube 67a is coupled through a dual diode tube 68a into a monostable multivibrator tube 69 of the delay trigger generator and causes it to flip-flop. A positive trigger derived by differentiating the resulting rectangular wave on the plate of one-half of said monostable multivibrator is applied to a bistable multivibrator tube 70 constituting the first stage of the pulse-time to voltage-amplitude converter. The quasistable state of the delay-trigger generator multivibrator tube 69 is longer than the scan, and when said multivibrator returns to the stable state, the triggers obtained from the plate thereof are used to reset the converter in preparation for the next scan as will be described later.

The start-pulse trigger from the plate of tube 67 of the start-pulse coincidence also goes to a short-time delay network. The negative pulse charges a condenser 71 through diode tube 68b. At the end of this pulse, condenser 71 discharges through another condenser 72, producing a positive pulse on the grid of a triode tube 67b which is biased to cut-off. The resulting negative pulse appearing on the plate thereof flips another monostable multivibrator 74 into the quasi-stable state. The length of time in this state is adjusted by a potentiometer 75 in the grid of a triode 74b so that the multivibrator return to the stable state just prior to the arrival of the voltage pulse corresponding to the crossing of the full-scale coordinates on the record chart. Thus, the rectangular wave appearing on the plate of the other half of the monostable multivibrator tube 74a occupies the time region between the two pulses corresponding to the zero and the full-scale coordinates. This circuit then becomes the gate generator which cooperates with the stop-pulse coincidence circuit by feeding its output to the grid of a triode tube 76a. The grids of all the tubes of the stop-pulse coincidence must be negative simultaneously before an appreciable change in voltage occurs across a common plate load resistor 77. The negative signal pulses are fed to the grid of tube 62a. The grid of 62b is biased beyond cutoff ordinarily but positive coordinate blanking pulses should be injected at this point if an attempt is made to use the subject automatic record chart analyzer on coordinate type chart paper. A pentode tube 78 is a gated-beam tube effectively containing two control grids. One grid received a negative acceptance circuit signal, which is effective for a brief period during each scan, the time position of which is determined by the position of the data line on the previous scan. Loss of the stop-pulse from the output of the stop-pulse coincidence circuit results in the other grid of tube 78 being made negative, thus disabling the acceptance feature. The grid of tube 76a receives the negative pulse from the gate generator, the effect of which is to admit only pulses from a region between and not including the extreme coordinate pulses. The coincidence output from tube 78 is in the form of positive pulses which are fed to tube 76b which, in turn, performs the same function as tube 67a in the start-pulse circuit mentioned above. The stop-pulse output from the plate of tube 76b is electrically coupled to a converter circuit and to an acceptant disabler circuit for further cooperation therewith.

The pulse-time-tube-voltage-amplitude converter circuit is referred to herein as a converter and includes the aforementioned bistable timing multivibrator tube 70. The positive start-pulse from the start-pulse coincidence circuit is applied through the delay-trigger generator to the grid of tube 70a, one-half of said multivibrator, throwing it into conduction and cutting off the other half of said multivibrator tube 70b. The parameters are such that the plate of tube 70b is negative with respect to ground when the tube is conducting and a pentode tube 79 connected to the output thereof is, therefore, cutoff. When tube 70b is cut off by the action initiated by the start-pulse, the plate goes positive with respective to ground and a timing condenser 80 in the plate circuit of tube 79 charges through said tube which effectively becomes a pentode linear-charging circuit. The rate of charging of said condenser is controlled by adjusting the screen voltage of tube 79 by regulating a potentiometer 81. Said condenser charges at a nearly-linear rate until the bistable multivibrator is returned to its original state by the stop-pulse. The stop-pulse is coupled into the bistable multivibrator through an isolation circuit to prevent trigger coupling between the stop-pulse channel and the start-pulse channel, inasmuch as it is necessary to use condenser coupling rather than diode coupling between the start-pulse concidence circuit and the bistable multivibrator of the converter circuit in order to eliminate the presence of high positive voltage in the input thereof. In the event of a misfire, that is, failure of the stop-pulse to come through, the bistable timing multivibrator is reset by the negative pulse appearing on the grid of tube 70a when the delay trigger generator monostable vibrator tube 69 returns to its stable state some time after the end of this scan. At that instant, another trigger from the scan multivibrator activiates a neon switch circuit 82 which discharges the timing condenser 80 so that it is ready to recharge on the following scan. Said neon switch is simply a neon tube that is connected in parallel with said timing condenser. The charging voltage of said timing condenser never reaches the breakdown potential of said neon switch until said neon switch is appropriately ionized by a pulse of radio frequency energy to be discussed later. Timing condenser 80 is directly coupled to a cathode follower tube 83. The wave form appearing on the cathode is characterized by a nearly-linear decrease in voltage during the charging of the timing condenser. When the stop-pulse stops the charging of the timing condenser, the voltage is held constant until, as previously mentioned, some time between scans when the condenser is discharged. During the whole period between the arrival of the stop-pulse and the discharge of said timing condenser, the voltage at the cathode of tube 83 is transferred to the grid of a continual level indicator tube 84 by means of another neon switch 85 which is bidirectional. Essentially, the action is one of correcting the voltage across a level adjust condenser 85 connected to the grid of pentode tube 84 to that of the cathode of cathode follower tube 83. The voltage sitting on said level adjust is then read by means of the cathode follower circuit constituting the continual level indicator and incorporating said tube 84. The adjustment or correction is initiated by the stop-pulse, which energizes neon switch 86. In the event of stop-pulses of less than novel amplitude, the level adjust action will ordinarily fail before the bistable timing multivibrator stop-pulse action, thereby preventing interacting disruptive spurious signals from being fed to the level indicator. The signal from continual level indicator tube 84 constitutes the output of the converter circuit. It is essentially a reproduction of the original data signal which was recorded on the chart.

As previously mentioned, the level adjust-level indicator combination is effectively a keyed-peaked reading volt meter. It has two advantages: (1) It responds rapidly to said signal level changes and, (2) an output signal is maintained in the event of the temporary loss of the data line signal which feature, of course, would be essential if the analyzer were to be used on coordinate type charts, since the data line thereon would be expected to coincide occasionally with one of the coordinate lines. However, for normal use with plain chart paper an increase in the scanning frequency would permit the use of a more conventional peak-reading volt meter, resulting perhaps in a significant simplification in circuitry.

The output of the continual level indicator is fed to an acceptance circuit where it is directly connected to a comparator contained therein. The acceptance circuit is again defined as a circuit that injects a gate into the stop-pulse coincidence which limits the area of the chart from which a stop-pulse will be accepted on any one scan to a region of given width on either side of the position of the data line on the previous scan. The output from the continual level indicator is transferred to said acceptance circuit. This circuit involves tubes which are electrically associated in such manner that they produce and inject a gate pulse into the stop-pulse coincidence circuit area of the chart from which a stop-pulse will be accepted on any one scan to a given width on either side of the data line of the previous scan as mentioned above. The input circuit portion of said acceptance circuit constitutes a comparator and includes a voltage divider network 87 which received the output signal from the aforesaid continual level indicator. Said voltage divider network in turn includes a potentiometer 88 with a voltage pickoff connected in parallel with a four and a half volt battery. Connected to the pickoff of said voltage divider network is a comparator pentode tube 89. Connected between the voltage pickoff of said voltage divider network and the cathode of said comparator pentode tube 89 is a diode tube 90b. Accordingly, a reference voltage is applied from said voltage pickoff to the plate of said diode, said reference voltage being equal to the voltage on the cathode of continual level indicator tube 84 plus a biased voltage obtained by tapping off of the four and a half volt battery, the voltage of which is reflected into the potentiometer of said divider network. In other words, the input signal voltage of the plate of diode 90b is equal to the sum of the voltage which represent the height of the data line on the previous scan plus a bias voltage. At the start of the scan, the cathode of comparator pentode tube 89 and the cathode of comparator diode 90b are positive with respect to the plate of said diode. This voltage decreases, however, with the charging of the timing condenser, but when it dips below that equal to the sum of the continual level indicator tube cathode-plus-bias voltage, the falling comparator tube 89 cathode potential is felt on the plate side of the comparator diode tube 90, which is directly connected to an isolation cathode tube 91. A small condenser 92 connected between the plate of tube 89 and the plate of comparator diode tube 90b cancels any cathode signal coupled to said diode plate by the inter electrode capacitance of diode tube 90b. Interposed between the plate of said comparator diode tube 90b and the voltage pickoff of the potentiometer of said voltage divider network is a large load resistance which prevents adding an appreciable signal component from tube 89 to the cathode of tube 84, thereby preventing interference with the operation of the continual level indicator. Thus it can be seen that the comparator merely functions to derive a trigger pulse at the instant that the descending time-condenser voltage crosses said reference level voltage.

The output of the aforesaid isolation cathode follower tube 91 is RC coupled into a pentode amplifier tube 93 after being clamped by a diode tube 90a. The time constant of this coupling circuit should be large to avoid attenuation of the relatively slow rate of rise of the signal and in interest of minimizing the aforementioned large signal to small signal shift. On the other hand the RC of said coupling circuit should be small enough to allow following of any rapid change in the data signal.

The amplitude of the input to amplifier tube 93 is such that the negative normal signal drives the tube almost to cutoff; then the output of said amplifier is almost the same for normal and misfire signals. This positive-going output signal from amplifier tube 93 is differentiated into the grid circuit of a blocking oscillator tube 94 through a condenser 95 and a diode tube 96b. The blocking oscillator tube 94 is biased below cutoff at a point determined by the setting of a potentiometer 97. The positive-going signal thus raises the grid of tube 94 above the cutoff point at which instance the regenerative cycle of the blocking oscillator takes over, a trigger is generated, and the oscillator blocked. Time constant of said blocking oscillator is such that the bias thereon is maintained beyond the time the positive trigger pulse from amplifier tube 93 decays, thus, this bias falls off and the fixed bias is then again in control before the start of the next scan. The negative trigger pulse from the plate of blocking oscillator tube 94 is diode coupled into a monostable multivibrator composed of triode tubes 98a and 98b. The rectangular pulse from the plate of 98a is an acceptance gate generator, the output of which is fed to tube 78 of the stop-pulse coincidence circuit. The position of the start of this gate is relative to the data signal pulse and is a function of the amount of bias inserted in series with the data signal reference voltage in the comparator. A variable potentiometer 99 is connected in the timing circuit of the monostable multivibrator constituting an acceptance gate generator where it controls the width of the gate. This potentiometer should be chosen for good tracking so that this gate will be centered on the data-lined signal as a minimum gate width is provided. It should be noted that said potentiometer 99 may be ganged with the aforesaid potentiometer 88 of the voltage divider network and when properly chosen should provide a uniform extension of the gate in equal amounts on either side of the data line signal.

In the event that the data-lined signal escapes the acceptance gate, due usually to an abrupt change in the data level on the chart, the acceptance gate circuit is automatically removed by an acceptance disabler circuit. The negative stop-pulse trigger are RC coupled from the plate of tube 76b of the stop-pulse coincidence to a cathode follower tube 100a. These negative pulses are of large amplitudes. The amplitude of a negative pulse available at the cathode follower output is determined by the setting of the D.C. biased level of the control grid of tube 100a. This amplitude determines the number of consecutive misfires necessary before the acceptance circuit is disabled. The low impedance cathode follower tube 100a drives an integrator tube 100b employed as a charging diode which, in turn, is coupled to an acceptance disabler tube 101. As long as the stop-pulses are coming, pentode tube 101 is cut off and the plate thereof is at B+ potential. Inasmuch as said plate potential is connected to the second control grid of stop-pulse coincidence tube 78, it is also positive in potential and, hence, conducts. But said stop-pulse coincidence tube 78 must be cut off in order for the stop-pulse to get through. It can, therefore, be seen that loss of the stop-pulse from the stop-pulse coincidence circuit due to a very abrupt change in the data level on the chart results in the removal of the cutoff bias of acceptance disabler pentode tube 101, causing the decrease of disabler plate voltage which, in turn, reduces the grid voltage of the stop-pulse coincidence tube 78 sufficiently to turn it off until such time as the acceptance gate region contains or regains the data-line signal.

As previously mentioned the timing capacitor discharge circuit and the level adjust discharge circuit constitute circuits involving a neon switch of the type depicted in FIG. 3. As shown, said neon switch circuit comprises a monostable multivibrator or flip-flop comprising a pentode tube 102a and a triode tube 102b. An oscillator 103 is connected to said multivibrator and constitutes a load therefor. When tube 102a which is one-half of said multivibrator is cutoff, said oscillator tube 103 is inoperative. Of course, when said 102a tube is cutoff, the adjacent multivibrator tube 102b is conducting. Normally, tube 102a and the oscillator cooperating therewith is inoperative and a neon tube 104 is de-ionized constituting an open circuit. When negative excitation trigger is applied to the grid of said tube 102b, it is cut off, thus causing said 102a tube and said oscillator tube 103 to become active. Normal flip-flop action ensues, and the oscillation continues from the time determined by the RC time constant of the coupling network between the plate of said 102a and the grid of tube 102b. Said oscillation results in the ionization of neon tube 104 and the impedance between the switch terminal thereof dropped to a few thousand ohms, thus effecting a closed switch condition. It should be noted that bypass capacitors 105 and 106 attached to the neon tube terminals furnish a low impedance pass for the ionizing RF energy. One capacitor should be variable and should be tuned for minimum D.C. voltage generator during the switch on time. After removal of the RF excitation from the neon tube due to the removal of the negative trigger from the grid of tube 102b, said neon tube de-ionizes and the switch effectively open. Hence, it can be seen if neon switches of the type thus mentioned are incorporated appropriately in the converter circuit as timing capacitor discharge and level adjust elements, the necessary voltage control will be provided to timely cause the discharge of said timing capacitor between scans and also results in proper level adjust operation. The converter output from the continual level indicator is substantially the reproduced data signal, differing from the originally recorded signal primarily by time and amplitude scale factors. This signal is applied to a corrector circuit depicted in FIG. 4. Specifically, the continual level indicator output signal is transferred to a D.C. amplifier stage 107 where it is appropriately amplified and then transferred to the horizontal plates of a corrector cathode ray tube 45. Vertical deflection is provided to said cathode ray tube by a linear-sweep generator which produces a linear saw-tooth sweep. The cathode ray tube spot 45 sweeps up from the bottom of the tube face to the top. A photomultiplier tube 48 observes this routine and generates a trigger at the instant a calibration line is crossed. The distance from the bottom of the trace to said calibration line is presented as the output of the subject automatic recorder chart analyzer in terms of the pulse width of the square wave signal emitting from a box car generator. This will now be fully explained.

In order to minimize D.C. amplifier drift problems, it has been found to be desirable that as little D.C. amplification as possible be required in applying the data signal to the cathode ray tube deflection plates. The dynamic range of voltage available at the grid of continual level indicator tube 84 of the converter circuit is 60 to 70 volts. Between the plate and cathode thereof there is, therefore, available a range of about 120 volts. This range will produce adequate deflection on said cathode ray tube; however, there is contained some unwanted D.C. voltage tube drops. This voltage drop is removed by means of dual diode D.C. amplifier tube 111 and effectuated circuit. In this circuit, the signal from the plate of tube 84 goes through a voltage divider network of the order to ground. The signal from the cathode goes through a duplicate divider back to B plus voltage. That is as chosen such that the D.C. potentials of the grids of both halves of triode amplifier 111 are equal as far as the continual level indicator tube 84 cathode and plate potentials are concerned, since they correspond to the middle of the useful range of said continual level indicator tube. Additional resistors from the grids of said amplifier tube 111 to a negative supply brings the voltage up to junction down to the mid-range value for said amplifier. The gain of this amplifier is such as compensate for the voltage-divider action of the coupling resistors, although it may be greater, of course. The net result is a balanced push-pull D.C. output which is insensitive to minor changes in the negative bias voltage, the power supply voltage, which, although regulated, may vary slightly from time to time.

Vertical deflection of this type of said cathode ray tube is produced by a phantastron-type linear sweep generator incorporating a tetrode tube 112 and a pentode tube 113. Tetrode tube 112 is the phantastron reset tube and charges up the grid-tube-plate timing condenser and returns the plate of said phantastron tube to B plus potential at the end of the linear rundown. Since the phantastron reset tube is actually a diatrom, the point of reset is determined by the setting of the grid bias thereon. During operation the plate voltage decreases in a regular phantastron manner until the grid-tube-cathode potential crosses the critical value at which time the diatron fires. Usually this firing will be initiated by a positive sink pulse from the leading edge of the unblanking pulse of the scan generator which arrives shortly before the diatron fine potential is reached.

The linear-sweep generator output signal is tapped out of a sweep amplitude potentiometer 114 and fed into a cathode follower tube 115a. The balanced output from said cathode follower is applied to the vertical deflection plate of the aforementioned cathode ray tube after being clamped by diode tubes 116a and 116b.

Cathode ray tube 45 is a tight-tolerance, flat-faced tube such as a 5ADP–11 type. This tube provides adequate intensity and spot definition at a low accelerating voltage. Also, it has a high deflection sensitivity. An astigmatism controls and it is used in conjection therewith because it is desirable if not essential to secure uniform spot size and shape over the entire face of the tube. It is important that the face of the cathode ray tube be free from imperfection such as glass bubbles are classed as weak spots. A protective cover plate of transparent plastic may be used for protection purposes since it is smaller. A mu-metal magnetic shield is essential. Further, for optimum operation thereof, it is advisable to treat the face of said tube and cover plate with an antistatic material.

The photomultiplier tube 48 is housed in an aluminum box and is mounted in front of the aforesaid cathode ray tube. The photomultiplier tube should ordinarily be located approximately nine inches from the face of said cathode ray tube. Both tubes must be carefully oriented so that the entire useful face of the cathode ray tube is seen by the photo cathode of the photomultiplier tube, otherwise operation will be faulty.

The photomultiplier tube 48 receives incoming radiant energy from the traveling spot of cathode ray tube 45, it produces an output signal wherein a positive voltage excursion corresponds to a decrease in light at said photomultiplier tube. This output signal is applied to a first amplifier stage tube 115b and then into an amplifier stage 116. From amplifier stage 116 it is then fed into the next amplifier stage tube 117. As a general rule, the vertical re-trace is accomplished by a decrease in light intensity as seen by said photomultiplier tube.

The pulse signal of voltage, which is positive at the grid of amplifier stage tube 117, is canceled by a negative pulse derived from screen grid of phantastron tube 113 of the linear-sweep generator circuit. In route thereto, it may be clamped by dual diode tube 118. The output of amplifier tube 117 is then applied to pentode 119, where the base-line is clamped at zero volts. Also, the RC network consisting of a resistor 120 and the pentode tube 119 input capacitance attenuates high frequency noise components of said signal. During normal running, the output signal of tube 119, which for each vertical sweep consists of a low-level noise component plus a positive voltage pulse corresponding to the crossing of the calibration line, is fed to an amplitude discriminator which is biased below cutoff at a point determined by a discrimination level control potentiometer 121. When said positive voltage pulse crosses the cutoff level, a negative trigger appeared at the plate of an amplitude discriminator tube 122. This trigger goes to a boxcar generator containing a bistable multivibrator tube 123. In addition, said negative trigger is also fed to the cathode ray tube intensity grid, providing feedback thereto and cutting off the cathode ray tube, thus insuring the constant amplitude and sharp leading edge of any pulse crossing the discrimination level. Simultaneously with the start of each vertical sweep of the spot across the face of cathode ray tube, a negative trigger from the screen grid of phantastron tube 113 is diode coupled through a tube 124a into the bistable multivibrator tube 123 of the boxcar generator. A second trigger is obtained through the trigger amplifier from the photomultiplier when the calibration line is crossed by said cathode ray tube spot and is coupled into said bistable multivibrator tube 123 by diode tube 124b, causing it to flip and produce a square wave whose pulse width is proportional to the distance between the zero coordinate of the chart and the data line thereon being analyzed. This square wave is the wave which is subsequently fed into any desired radar equipment such as a moving pin recorder, a counter, an analog computer counter, a digital computer, or the like.

Calibration of all the forementioned considered circuit elements is effected by a calibration-delay-trigger generator. This generator comprises the circuit of a tube 126 containing triodes 125a and 125b. A cal-run switch 126 is interposed between said boxcar detector, said calibration delay-trigger generator, and said trigger amplifier, in such manner that said boxcar detector may be electrically connected to either the calibration delay trigger generator for calibration purposes or to said trigger amplifier for ordinary running purposes. In other words, when the cal-run switch is connected to the calibration position, as illustrated in FIG. 4, the calibration delay-trigger generator is electrically connected to the boxcar generator through a pentode tube 127 and the amplitude discriminator. And when the cal-run switch is connected in the run position, the boxcar generator is electrically connected to the trigger amplifier. When the run-cal switch is in the calibration position, B plus voltage is applied to a trigger circuit comprising diode tubes 125a and 125b. The linear rundown on the cathode of cathode follower 115a is impressed through a resistance network 128 and a calibration trigger delay control path, onto the grid of triode tube 125a. Said grid is also biased by an adjustable potentiometer 129 included in the aforesaid resistance network. So doing enables a trigger to be produced at any given time after the start of the vertical sweep of the cathode ray tube. This is accomplished by varying the grid return bias which determines the voltage to which the cathode follower tube 115a must descend; hence the delay of time before triggering. The delay range provided is of the order of 250 to 16,000 micro-seconds. The negative trigger output from trigger tube 125 is coupled to the cathode ray tube intensity grid and to an amplifier which presents a positive pulse to the amplitude discriminator which simulates the trigger normally derived from the photomultiplier tube, which is, of course, removed during the calibration procedure. It will be noted that, in this circuit, two passes are provided which apply the negative calibration trigger to the cathode ray tube intensity grid. One is through the condenser-voltage divider path directly from the plate of calibration delay-trigger generator tube 125. The other is through the feedback pass from the plate of the amplitude discriminator. Also, the calibration trigger being fed back from the plate of the amplitude discriminator tube 122 is of too short duration to produce visible blanking on the cathode ray tube at the 60 cycle per second sweep rate. Hence it may be seen that the output signal of the calibration delay-trigger generator may be employed to vary the width of the square wave output signal from the boxcar generator which thus enables adjustment thereof to be obtained for calibration purposes.

Figure 5:
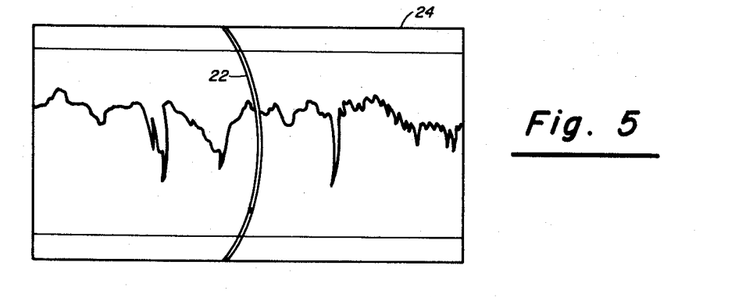
FIG. 5 is an illustration of the moving chart and the scanning light spot.

Briefly, the operation of the device of this invention is as follows. As illustrated in FIG. 5, the sweeping and blanking generator causes the spot of the flying spot scanner 22 to traverse a path back and forth across a moving chart 24 containing the data to be analyzed in such manner that said data is scanned at a given desired rate. In order to provide a constant spot intensity as the scanning process takes place, an automatic intensity control system cooperates with the electrons and multiplying spot scanner, thus causing uniform spot light to be emitted therefrom and transmitted to said chart. As said chart is moved along by its chart drive mechanism, the light from the flying spot is reflected therefrom in proportion to the reflection powers of the surface of said chart of any given instant. In the event that the graphic data being analyzed is shown upon the chart as a dark or opaque line, obviously its absorption powers would be greater than that of the ambient light colored surface of the paper upon which it is printed. Therefore, it is seen that the reflective intensities from the chart will vary as the flying spots scans across the data line. Whether or not a dark data line is printed upon a light background surface or whether a light data line is printed upon a dark chart background surface is immaterial for the purposes of this invention because the only critical factor involved is the change in the amount of reflection from said chart as it is being scanned by the flying spot scanner. It may, therefore, be seen by the artisan that it would be entirely possible to make use of inks which have highly reflective characteristics as a means for presenting the graphic data on a chart. Likewise chart surfaces containing highly reflective chemicals could be used as a background for a data line presented in a substantially non-reflective form.

Figure 6:
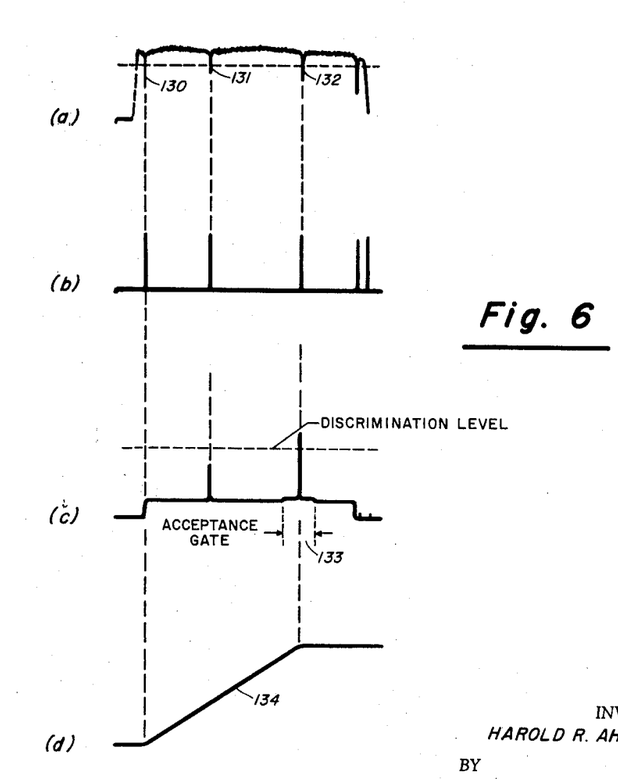
FIG. 6 is a timing diagram showing the time relations between various operational events during a single chart scan.

The light reflected from the chart is observed by two photomultiplier tubes which are directed in such manner that the effective field of each is one-half of the chart width. These photomultiplier tubes produce an electrical signal as an output which is proportional to the intensity of the observed reflected light from the flying spot scanner. This output signal is generally of the type illustrated in FIG. 6(a), after being cleaned up somewhat by intensity and shading control circuits in the input amplifier. For example, FIG. 6(a) shows a scan which illustrates a pulse representing the zero-coordinate of the chart. Also indicated is a pulse 131 representing the error due to perhaps a paper imperfection or the like. Then a pulse 132 is illustrated which represents the data-line itself. Of course these pulses are actually superimposed upon the scan signal as the flying spot traverses the width of the chart. Because of noise signals and other random transit signals, the basic scan signal will be somewhat irregular but is sufficiently regular to produce significant distinctions between said noise and transient signals and the various data-line pulses. As well as being cleaned up by intensity and shading controlling circuits within the input amplifier, the output signal from the photomultipliers are converted to clean signal pulses by discriminator actions. These output signals from the input amplifiers are illustrated in FIG. 6(b). It can be seen that the scan pulses are identical in time with the pulses generated by the photomultiplier tube as illustrated in FIG. 6(a).

The output signals from the input amplifiers are then set into a pulse selector circuit and into start-pulse coincidence circuits representing the zero coordinate of the chart and also into stop pulse coincidence circuit representing the data line. The output signal from these two coincidence circuits are alternately fed into a timing capacitor whose charging is initiated and stopped respectively thereby. Hence the charge on said timing capacitor is directly proportional to the distance on the chart between the zero coordinate and the graphic data line. For all practical purposes, it has been found that it is only necessary to actually scan that portion of the chart which is within a small region 133 on either side of the data line position of the previous scan and that so doing includes the operation considerably by eliminating mysterious signals which might be encountered due to the aforementioned paper imperfections, etc. To accomplish this, the stop-pulse coincidence circuit is acted upon by an acceptance circuit including an acceptance gate generator which in effect is really a narrow gate the width of which may be readily adjusted to prevent actual selection and operation of the stop-pulse coincidence in event that the trigger signal emitting therefrom and representing the data line does not fall within a given region on either side of the data line on the previous scan. This circuit has the effect of substantially removing the majority of interference signals which would adversely affect the working output signals. FIG. 6(c) shows the output wave form from the stop-pulse coincidence and illustrates the principle of pulse selection after being influenced and improved by said acceptance circuit.

Figure 7:
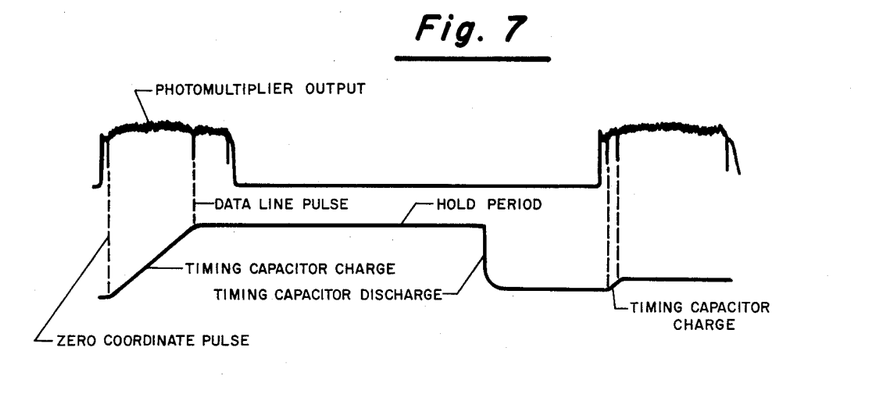
FIG. 7 is a timing and voltage diagram showing the time-voltage relationship that may exist on the timing circuit during an entire scan cycle.

In order to discharge the timing capacitor between scans a timing capacitor discharge circuit is incorporated within the converter circuit along with said timing capacitor. This discharge circuit merely acts as a timer which accepts initiating signal from said start-pulse coincidence circuit and delays said signal sufficiently to timely operate a switching system which effectively short circuits and timing capacitor to discharge same. FIG. 6(d) depicts a curve 134 of the voltage existing on the timing capacitor at any given instant between the time the flying spot passes over the zero-coordinate of the chart and the graphic data line. To illustrate further the cooperative operation between the various sundry and signal pulses and the charging of the timing capacitor, FIG. 7 is presented and is believed to be self explanatory. The output signal from the aforementioned timing capacitor is converted into a more useful form by level adjust and continual indicator circuits and then applied to the horizontal plates of the cathode ray tube. Said signal in conjunction with the signal from a vertical sweep generator causes the light spot of the electron gun of said cathode ray tube to sweep across the face thereof and across a calibration mark on said face which, in turn, causes a second or off trigger to be produced from a multiplier tube trained on an observing face of said cathode ray tube when said spot sweeps across said calibration mark. Again the scanning time between the start of the sweep of said spot and the crossing of said calibration mark is proportional to the distance between the zero coordinate of the chart and the graphic data line thereon. These start and stop signals are then appropriately applied to the boxcar generator where they modulate the square wave signal thereof in such manner as to vary the width of the rectangular width pulses constituting the output of said boxcar generator and representing the data on the record chart. This is the output signal which is then applied either individually or in concert to pulse width to voltage amplitude converters which, in turn, operate moving pen recorders for graphic replot; or gated trigger generators which, in turn, operate counters for accumulative amplitude distribution; or analog to digital converters which in turn may operate tape perforators for punching intelligence on paper tape; or other computer systems as would be advantageously employed to comply with various and sundry operational requirements.

As previously mentioned calibration of the entire system is effected by adjusting the boxcar output signal width to coincide with the calibrated input according to some convenient relationship and marking the position of a blank spot appearing on the face of the cathode ray tube while an off-trigger is supplied to said boxcar generator by a variable-delay trigger generator.

It would appear to be noteworthy that the automatic record chart analyzer constituting the subject invention is capable of reducing the data recorded by graphic recorders on charts at an expeditious rate with an accuracy which is optimum for many practical purposes.

It should be understood, of course, that the foregoing disclosure relates to only a preferred embodiment of the invention and that numerous modifications or alterations may be made therein without departing from the spirit and scope of the invention as set forth in the appended claims.

What is claimed and desired to be protected by the Letters Patent of the United States is:

1. An automatic record chart analyzer system comprising in combination, a movable chart containing a zero-coordinate and a linear graphic record printed thereon, drive means for moving said chart along a predetermined path at a predetermined speed, means disposed for periodically projecting and sweeping a scanning spot of radiant energy across said chart, photosensitive means disposed in the path of said radiant energy spot after it has been reflected from said chart for producing output signals in accordance with the amount of reflection received thereby as said radiant energy spot passes over the aforesaid zero-coordinate and said linear graphic record respectively, means effectively coupled to the output of said photosensitive means for passing the output signals produced thereby only when said radiant energy spot is passing over said zero-coordinate and an area restricted to a predetermined region on either side of the immediate previously scanned linear graphic record printed on said chart comprising a start-pulse coincidence circuit, a stop-pulse coincidence circuit adapted for being effectively connected to one of the inputs of said timing capacitor, a broad gate generator interconnecting the output of said start-pulse coincidence circuit and one of the inputs of said stop-pulse coincidence circuit, a comparator effectively connected to the outputs of said start-pulse coincidence circuit and the output of said timing capacitor, a trigger generator coupled to the output of said comparator, and a narrow acceptance gate generator connected between the output of said trigger generator and another input to said start-pulse coincidence circuit, timing capacitor means, means interconnecting said signal passing means and said timing capacitor means for initiating and discontinuing the charging thereof in response to the signals respectively passed by said signal passing means when said radiant energy spot is passing over said zero-coordinate and the linear graphic record located within said restricted area, means interconnecting said signal passing means and said timing capacitor for discharging said timing capacitor between the periodic sweeps of said scanning spot across said chart, means coupled to said timing capacitor for producing square wave signals having a frequency proportional to the chart distance between said zero-coordinate and said linear graphic record in response to the charge thereon at any given instant, and means coupled to the output of said square wave producing means for reading out the frequency of the square waves therefrom in terms of the aforesaid chart distance.

2. The apparatus of claim 1 further characterized by an acceptance disabler connected to said stop-pulse coincidence circuit for disabling same in event the linear graphic record deviates from the aforesaid restricted area and reactivating same when said linear graphic record reappears within said restricted area.

3. An automatic data analyzer comprising in combination, a movable chart containing a zero-coordinate and graphic data relative thereto, electron gun means for projecting a spot of light on said chart, means connected to said electron gun means for controlling the intensity of said projected light spot, means coupled to said electron gun means for sweeping and blanking said spot for effecting predetermined scanning of said chart therewith, photosensitive means contiguously disposed with said chart in the path of said light spot after it is reflected from said chart for producing an output signal in proportion to the instantaneous reflection intensity thereof, drive means for moving said chart along a predetermined path at a predetermined speed during the scanning thereof by said projected light spot, means coupled to said sweeping and blanking means and the aforesaid photosensitive means for effectively restricting the output of said photosensitive means to the time period corresponding to that portion of the chart scan when said projected light spot is reflected from said zero-coordinate and a predetermined area on either side of the immediate preceding scanned data position, means connected to the last mentioned means for effectively restricting the output of said photosensitive means for discharging said timing capacitor after said light spot is reflected from said predetermined scanned area, means connected to said timing capacitor for producing a square wave signal having a frequency which varies with the charge thereon after said projected light spot is reflected from said predetermined area comprising a level adjust, a continual level indicator coupled to the output of said level adjust, a cathode ray tube having a calibration line marked on the face thereof coupled at one of its inputs to the output of said continual level indicator, a photomultiplier tube disposed adjacent the face of said cathode ray tube, a boxcar generator having one of its inputs connected to the output of said photomultiplier tube, and a vertical sweep generator having a pair of outputs each of which is respectively coupled to the other inputs of said boxcar generator and the aforesaid cathode ray tube, and means responsive to said square wave signal for reading out the frequency thereof in terms of parameters which are proportional to the chart distance between the aforesaid zero-coordinate and said related data.

References Cited in the file of this patent
UNITED STATES PATENTS

| | | |
|---|---|---|
| 2,804,550 | Artzt | Aug. 27, 1957 |
| 2,889,535 | Rochester et al. | June 2, 1959 |
| 2,894,247 | Relis | July 7, 1959 |
| 2,894,248 | Relis et al. | July 7, 1959 |
| 2,897,481 | Shepard | July 28, 1959 |
| 3,009,064 | Cook et al. | Nov. 14, 1961 |